US012587799B2

(12) United States Patent
Suto et al.

(10) Patent No.: US 12,587,799 B2
(45) Date of Patent: Mar. 24, 2026

(54) SMART NOISE POLLUTION REDUCTION OF BLUETOOTH BASED DEVICES

(71) Applicant: International Business Machines Corporation, Armonk, NY (US)

(72) Inventors: Tiberiu Suto, Franklin, NY (US); Juan Pablo Parga Jimenez, Guadalajara (MX); Bryan Fernando Rangel Aguirre, Ocotlan (MX); Olga María Rojo Lugo, Tlajomulco de Zuñiga (MX)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 18/474,526

(22) Filed: Sep. 26, 2023

(65) Prior Publication Data

US 2025/0106574 A1     Mar. 27, 2025

(51) Int. Cl.
*H04R 29/00* (2006.01)
*H04B 17/318* (2015.01)

(52) U.S. Cl.
CPC ......... *H04R 29/001* (2013.01); *H04B 17/318* (2015.01); *H04R 2420/07* (2013.01); *H04R 2430/01* (2013.01)

(58) Field of Classification Search
CPC ....... H04B 17/318; H04L 67/02; H04L 67/55; H04M 1/24; H04M 1/72412;
(Continued)

(56) References Cited

U.S. PATENT DOCUMENTS 7,742,790 B2     6/2010   Konchitsky
10,853,897 B2   12/2020   Williams
(Continued)

FOREIGN PATENT DOCUMENTS

CN     114327734 A     4/2022
CN     114659617 A     6/2022
(Continued)

OTHER PUBLICATIONS

Apple, "Apple", Apple Inc., Accessed Aug. 15, 2023, 4 Pages.
(Continued)

*Primary Examiner* — Lun-See Lao
(74) *Attorney, Agent, or Firm* — Anthony M. Pallone

(57)     ABSTRACT

According to one embodiment, a method, computer system, and computer program product for reducing volume of a wireless audio device is provided. The embodiment may include monitoring, via a listening device, audible sounds and corresponding sound levels at a first location of an environment; identifying an audible sound at the first location with a corresponding sound level which exceeds a decibel threshold of the environment; creating a list of Bluetooth-enabled (BE) speakers, sorted by decreasing signal strength, discoverable via the listening device; capturing a segment of the audible sound; sending, from the listening device, a volume reduction request to a topmost BE speaker of the list located at a second location of the environment; responsive to receiving, at the listening device, a notification of match from the topmost BE speaker, re-measuring the corresponding sound level; and confirming the corresponding sound level is compliant with the decibel threshold.

20 Claims, 4 Drawing Sheets

100

(58) Field of Classification Search

CPC ......... H04M 1/72442; H04M 1/72445; H04M 2250/02; H04N 21/43637; H04R 2227/005; H04R 2420/07; H04R 2430/01; H04R 27/00; H04R 29/001; H04R 29/007; H04R 3/12; H04W 12/033; H04W 12/47; H04W 12/61; H04W 4/80; H04W 8/005; H04W 88/10

USPC ........................ 381/104–109, 57–58; 700/94

See application file for complete search history.

(56) References Cited

U.S. PATENT DOCUMENTS

| | | | | |
|---|---|---|---|---|
| 2019/0104373 | A1* | 4/2019 | Wodrich .............. | H04R 29/001 |
| 2020/0359154 | A1 | 11/2020 | Brown et al. | |
| 2021/0392451 | A1* | 12/2021 | Lee ...................... | H04R 29/001 |
| 2022/0386051 | A1 | 12/2022 | Elsley | |
| 2023/0244437 | A1* | 8/2023 | Doken .................... | G06F 3/165 |
| | | | | 381/57 |

FOREIGN PATENT DOCUMENTS

| | | | |
|---|---|---|---|
| CN | 115358718 | A | 11/2022 |
| CN | 116069287 | A | 5/2023 |
| CN | 113616898 | B | 8/2023 |
| IN | 202121050703 | A | 11/2021 |
| IN | 202211020762 | A | 4/2022 |
| WO | 2017000813 | A1 | 1/2017 |
| WO | 2025/068787 | A1 | 4/2025 |

OTHER PUBLICATIONS

Auger et al., "Environmental noise pollution and risk of preeclampsia", Environmental Pollution, vol. 239, Aug. 2018, 10 Pages.
Bosch, "Hydrogen—energy for the future", Bosch Global, Accessed Aug. 15, 2023, 11 Pages.
Continental, "Infotainment", Continental Automotive, Accessed Aug. 15, 2023, 6 Pages.
EPA, "Clean Air Act Title IV—Noise Pollution", EPA, United States Environmental Protection Agency, Aug. 2023, 7 Pages.
Felman, Adam, "What to know about high blood pressure", Medical News Today, Jan. 4, 2023, 44 Pages.
Gupta et al., "Noise Pollution and Impact on Children Health", The Indian Journal of Pediatrics, vol. 85, Springer, Jan. 9, 2018, 7 Pages.
IBM, "IBM Cloud Pak for Data", IBM, Accessed on Aug. 15, 2023, 18 Pages.
IBM, "IBM Unified Data Model for Healthcare", IBM, Accessed on Aug. 15, 2023, 7 Pages.
IBM, "IBM Watson Health is now Merative", IBM, Accessed on Aug. 15, 2023, 3 Pages.
IBM, "IBM Watson", IBM, Accessed on Aug. 15, 2023, 12 Pages.
Jariwala et al., "Noise Pollution & Human Health: A Review", Conference: Noise and Air Pollution: Challenges and Opportunities, ResearchGate, Mar. 2017, 5 Pages.
Leonard, Jayne, "What is REM sleep?", Medical News Today, Apr. 25, 2023, 15 Pages.
Sound Intelligence, "Audio Analytics For Professionals", Sound Intelligence, Accessed Aug. 15, 2023, 3 Pages.
Squarehead Technology, "Converting sound to impact", Squarehead Technology, Accessed Aug. 15, 2023, 3 Pages.
Ventureradar, "Top Sound Sensors Companies", VentureRadar, Accessed Aug. 15, 2023, 6 Pages.
Viet et al., "Assessment of Noise Exposure to Children: Considerations for the National Children's Study", Journal of Pregnancy and Child Health 1(1), National Library of Medicine, Oct. 2014, 15 Pages.
Westman et al., "Noise and Stress: A Comprehensive Approach", Environmental Health Perspectives, vol. 41, 1981, 19 Pages.
International Searching Authority, "Notification of Transmittal of the International Search Report and the Written Opinion of the International Searching Authority, or Declaration," Patent Cooperation Treaty, Nov. 25, 2024, 10 pages, International Application No. PCT/IB2024/057563.

* cited by examiner

100

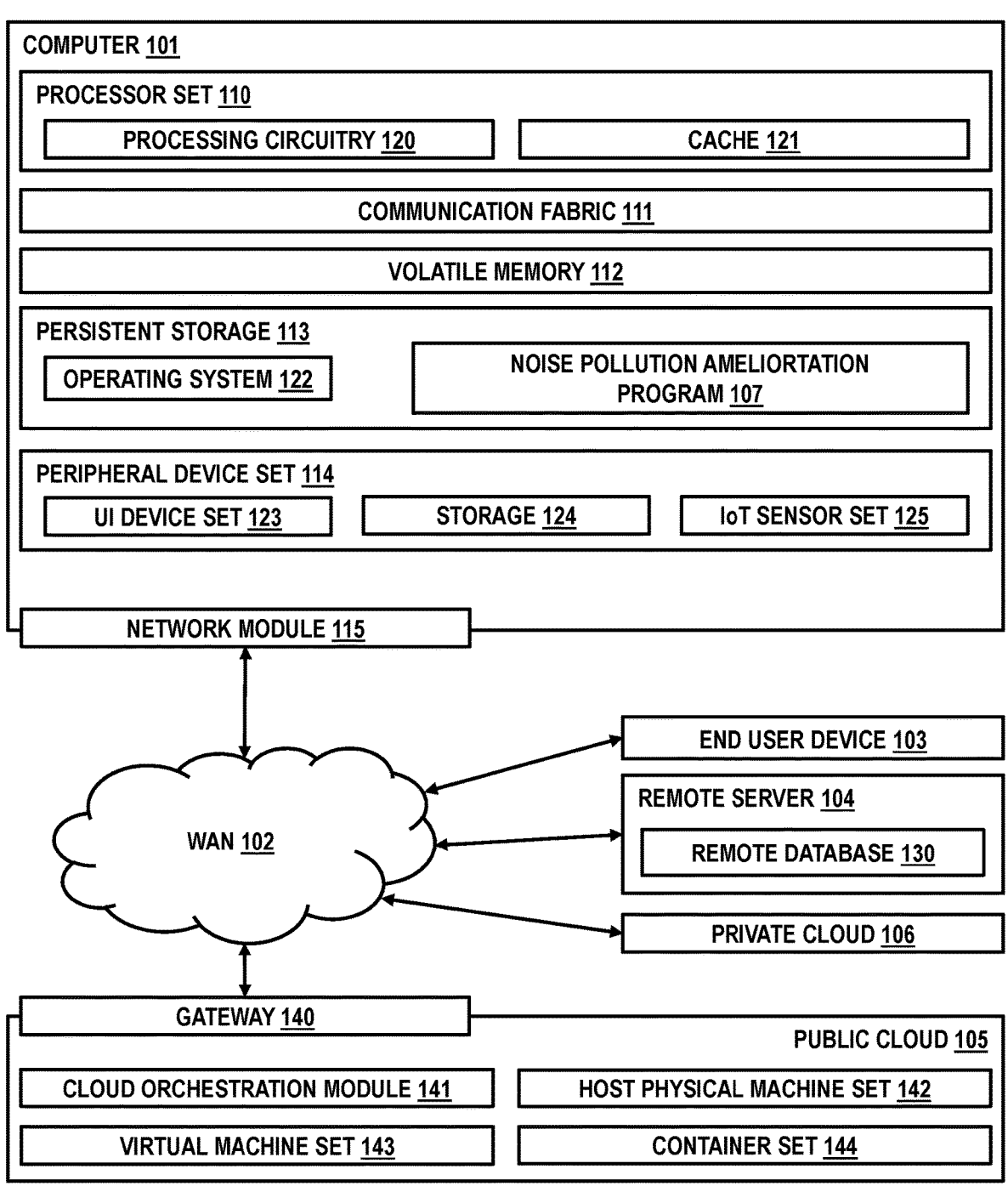

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122          NOISE POLLUTION AMELIORTATION PROGRAM 107

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

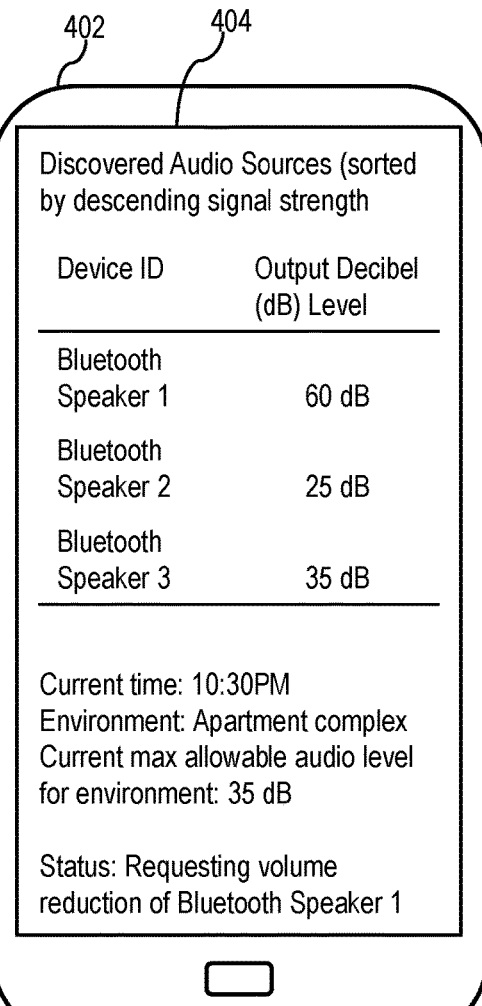

Discovered Audio Sources (sorted by descending signal strength

| Device ID | Output Decibel (dB) Level |
|---|---|
| Bluetooth Speaker 1 | 60 dB |
| Bluetooth Speaker 2 | 25 dB |
| Bluetooth Speaker 3 | 35 dB |

Current time: 10:30PM
Environment: Apartment complex
Current max allowable audio level
for environment: 35 dB Status: Requesting volume
reduction of Bluetooth Speaker 1

Discovered Audio Sources (sorted by descending signal strength

| Device ID | Output Decibel (dB) Level |
|---|---|
| Bluetooth Speaker 1 | 34 dB |
| Bluetooth Speaker 2 | 25 dB |
| Bluetooth Speaker 3 | 35 dB |

Current time: 10:31PM
Environment: Apartment complex
Current max allowable audio level
for environment: 35 dB Status: Volume of discovered audio
sources are compliant

Figure 5

SMART NOISE POLLUTION REDUCTION OF BLUETOOTH BASED DEVICES

BACKGROUND

The present invention relates generally to the field of computing, and more particularly to wireless audio devices.

Wireless audio devices include wireless speakers which are loudspeakers that receive audio signals using radio frequency (RF) waves rather than over audio cables. The two most common RF frequencies that support audio transmission to wireless speakers include Wi-Fi and Bluetooth connections to transmit audio data to a receiving speaker. In a common scenario, a smart device (e.g., a smartphone, a smart speaker, a laptop) may be paired to one or more wireless speakers and serve as the source for music that will be played through the one or more wireless speakers. Further, a user of the smart device may control playback operation of the one or more wireless speakers via the smart device. In another scenario, a wireless speaker itself may be enabled as a smart device which may connect, share information, and interact with its user and other smart devices. Smart devices generally connect to other devices or networks via different wireless protocols (e.g., Bluetooth, Zigbee, Near-Field Communication (NFC), Wi-Fi, and cellular networks) and may operate, to some extent, interactively and autonomously. Smart devices and wireless speakers play a fundamental role in today's commercial electronic industry and are at the center of the Internet-of-Things (IoT). For example, Bluetooth-enabled speakers have become widely popular due to their convenience, portability, and ability to provide high quality sound without the need for physical connections such as cables.

SUMMARY

According to one embodiment, a method, computer system, and computer program product for reducing volume of a wireless audio device is provided. The embodiment may include monitoring, via a listening device, audible sounds and corresponding sound levels at a first location of an environment. The embodiment may include identifying an audible sound at the first location with a corresponding sound level which exceeds a decibel threshold of the environment. The embodiment may include creating a list of Bluetooth-enabled (BE) speakers discoverable via the listening device. The list is sorted by decreasing signal strength. The embodiment may include capturing a segment of the audible sound. The embodiment may include sending, from the listening device, a volume reduction request to a topmost BE speaker of the list. The topmost BE speaker is located at a second location of the environment. In response to receiving, at the listening device, a notification of match from the topmost BE speaker, the embodiment may include re-measuring the corresponding sound level of the audible sound. The embodiment may include confirming the corresponding sound level is compliant with the decibel threshold.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary computer environment according to at least one embodiment.

FIG. 4 is an illustration of a list of discovered Bluetooth-enabled speakers displayed on a mobile computing device.

FIG. 5 is an illustration of an updated list of discovered Bluetooth-enabled speakers displayed on a mobile computing device.

DETAILED DESCRIPTION

Figure 2:
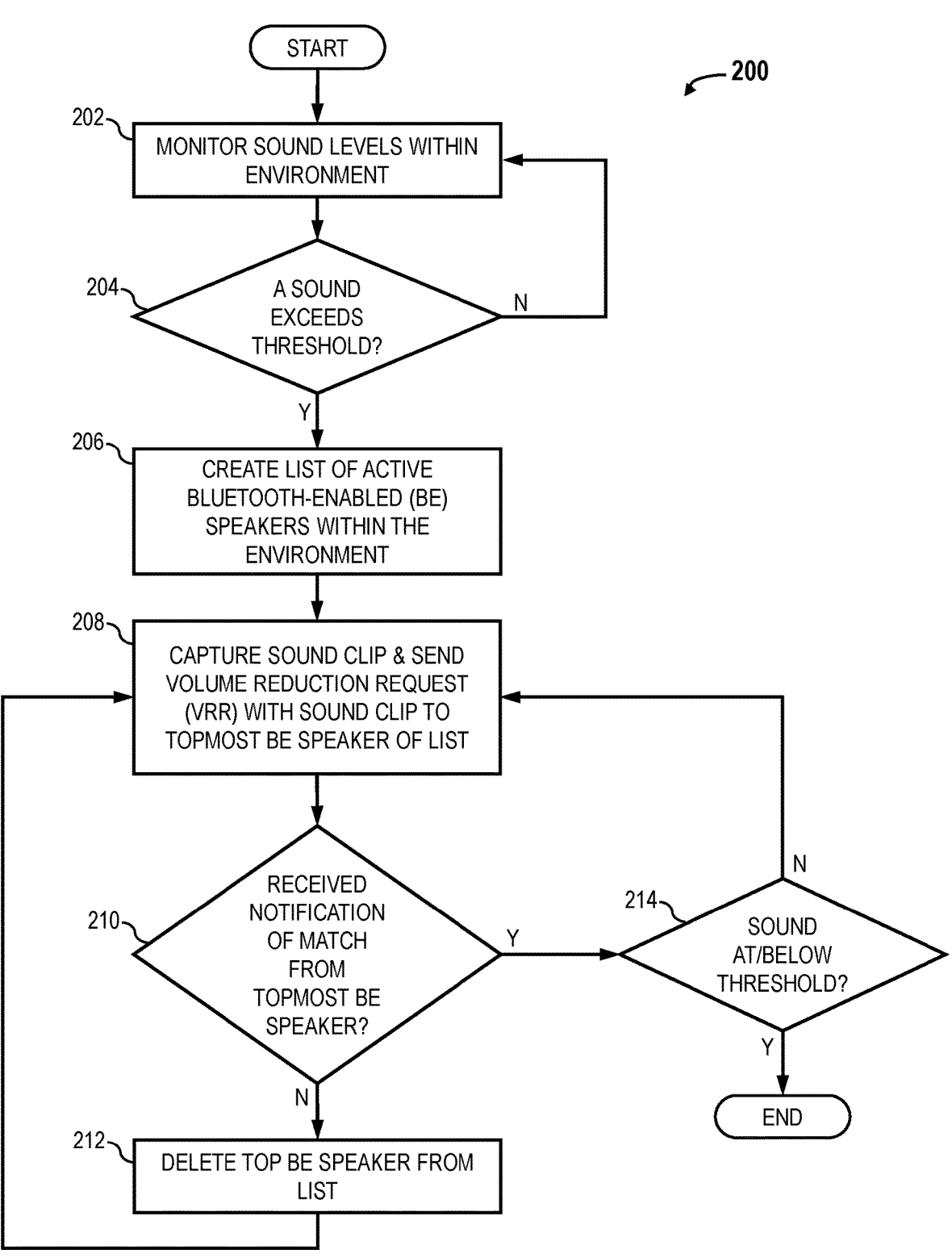
FIG. 2 illustrates an operational flowchart for requesting volume reductions of one or more wireless audio devices via a smart noise pollution monitoring process according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention relates generally to the field of computing, and more particularly to wireless audio devices. The following described exemplary embodiments provide a system, method, and program product to, among other things, remotely reduce output sound volume of a Bluetooth-enabled audio device when a sound level generated by the device exceeds an established threshold. Therefore, the present embodiment has the capacity to improve the technical field of wireless audio devices by dynamically reducing the volume output (i.e., decibel level) of a wireless audio device, or a group of wireless audio devices, within an environment when an established decibel threshold of the environment has been exceeded thus reducing noise pollution caused by one or more wireless audio devices within the environment.

As previously described, wireless audio devices include wireless speakers which are loudspeakers that receive audio signals using radio frequency RF waves rather than over audio cables. The two most common RF frequencies that support audio transmission to wireless speakers include Wi-Fi and Bluetooth to transmit audio data to a receiving speaker. In a common scenario, a smart device (e.g., a smartphone) may be paired to one or more wireless speakers and serve as the source for music that will be played through the one or more wireless speakers. Further, a user of the smart device may control playback operation of the one or more wireless speakers via the smart device. In another scenario, a wireless speaker itself may be enabled as a smart device which may connect, share information, and interact with its user and other smart devices. Smart devices generally connect to other devices or networks via different wireless protocols (e.g., Bluetooth, Zigbee, NFC, Wi-Fi, and cellular networks) and may operate, to some extent, interactively and autonomously. Smart devices and wireless speakers play a fundamental role in today's commercial electronic industry and are at the center of the IoT. For example, Bluetooth-enabled speakers have become widely popular due to their convenience, portability, and ability to provide high quality sound without the need for physical connections such as cables.

As mentioned above, Bluetooth-enabled speakers are ubiquitous nowadays allowing users to re-route sound playback from their smaller speaker devices (e.g., mobile phones and smart TVs) to larger Bluetooth-enabled speakers with room-filling sound. While some such speakers have a power output as high as 500 W and can provide a great listening experience to a user of the speaker, they may nevertheless cause noise pollution to others in the vicinity. For example, in an urban environment such as an apartment complex, although a first person may be enjoying room-filling sound from their Bluetooth speaker within their apartment, the decibel level (resulting from the level of sound output of the Bluetooth speaker) within an adjoining apartment may be causing noise pollution for a second person. Noise pollution refers to the propagation of excessive, disturbing, or harmful sound that interferes with normal activities and causes discomfort, annoyance, or adverse effects on human health and the environment. It is a form of environmental pollution caused by various sources of noise, such as traffic, industrial activities, entertainment venues, and everyday urban life. In an effort to address noise pollution, communities may implement regulations and noise control measures such as setting noise level limits for different activities and/or venues and promoting the use of quieter technologies and equipment. It may therefore be imperative to have a system in place to identify a Bluetooth-enabled audio device (e.g., a Bluetooth speaker) causing noise pollution in an environment and send a command to the device which dynamically reduces an output sound level of the device based on a maximum allowable sound level for the environment. Thus, embodiments of the present invention may be advantageous to, among other things, identify discoverable Bluetooth-enabled audio devices within an environment of a user, maintain a governing table of time-based allowable decibel levels for an environment, monitor output sound levels of identified Bluetooth-enabled audio devices within an environment, identify a Bluetooth-enabled audio device with an output sound level which exceeds an allowed decibel level for an environment, maintain a list of sound producing Bluetooth-enabled audio devices and their respective output decibel levels, capture sound clips produced by a Bluetooth-enabled audio device both at the device itself and at a second location, store a captured sound clip within a memory buffer of a Bluetooth-enabled audio device, compare a sound clip of a sound producing Bluetooth-enabled audio device captured at the device with a received sound clip of the sound producing Bluetooth-enabled audio device captured at a second location, send a volume reduction request to a Bluetooth-enabled audio device, receive a volume reduction request at a Bluetooth-enabled audio device, receive an acknowledgment (i.e., notification) of match or non-match in response to a sent volume reduction request, reduce output volume of a Bluetooth-enabled audio device, request an incentivized allowance which permits a sound level of a Bluetooth-enabled audio device to exceed a decibel limit of an environment for a period of time, and implement an accepted incentivized allowance. The present invention does not require that all advantages need to be incorporated into every embodiment of the invention.

According to at least one embodiment, sound levels within an environment may be continuously monitored via a device of a first user to identify a produced sound level which exceeds an established time-of-day based decibel threshold of the environment. In response to identifying a produced sound level which exceeds the threshold, a table of discoverable Bluetooth-enabled speakers of other users within the environment may be created. The table may be sorted according to decreasing Bluetooth signal strength and may also include respective attributes of each discovered Bluetooth-enabled speaker. A sound clip of the threshold exceeding sound level may be captured by the device of the first user and sent, along with a volume reduction request, to a topmost discovered Bluetooth-enabled speaker of the table until a matching sound clip acknowledgment is received from a speaker identified as the source of the threshold exceeding sound level. Further requests for volume reduction may be sent until the speaker identified as the source no longer produces a sound level which exceeds the threshold. According to at least one embodiment, an active (i.e., sound producing) Bluetooth-enabled speaker within the environment may locally store a sound clip of the current audio playback. In response to a volume reduction request, with an accompanying sound clip, being received at the active Bluetooth-enabled speaker, a comparison between the received sound clip and the locally stored latest sound clip may be performed. In response to the received sound clip and the locally stored sound clip matching to a threshold degree and/or threshold confidence level, volume of the active Bluetooth-enabled speaker may be reduced.

According to at least one other embodiment, a request for operation (i.e., sound playback) of a Bluetooth-enabled speaker within the environment to exceed, for a specified time period, a governing time-of-day based decibel threshold may be sent to one or more other users within the environment. The request may be incentivized to encourage acceptance by the one or more other users. Upon acceptance of the request by another user, a sound monitoring device of the other user may not send a volume reduction request to the Bluetooth-enabled speaker in response to identification of a produced sound level which exceeds the threshold during the specified time period.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to identify a Bluetooth-enabled audio device having an output sound level which exceeds an established time-of-day based threshold of an environment of the device and, accordingly, remotely reduce the output sound level of the device such that it is in accordance with the established time-of-day based threshold.

Referring to FIG. 1, an exemplary computing environment 100 is depicted, according to at least one embodiment. Computing environment 100 contains an example of an environment for the execution of at least some of the computer code involved in performing the inventive methods, such as noise pollution amelioration (NPA) program 107. In addition to NPA program 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and NPA program 107), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smartphone, smart watch or other wearable computer, mainframe computer, quantum computer or any other form of computer or mobile device now known or to be developed in the future that is capable of running a program and accessing a network or querying a database, such as remote database 130. Additionally, computer 101 may be any other form of computer or mobile device now known or to be developed in the future that is AR/VR-enabled. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in NPA program 107 within persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in NPA program 107 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as smart glasses, smart watches, AR/VR-enabled headsets, and wearable cameras), keyboard, mouse, printer, touchpad, Bluetooth-enabled speakers, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, another sensor may be a motion detector, another sensor may be a global positioning system (GPS) receiver, and yet another sensor may be a digital image capture device (e.g., a camera) capable of capturing and transmitting one or more still digital images or a stream of digital images (e.g., digital video).

Network module 115 is the collection of computer software, hardware, and firmware that allows computer 101 to communicate with other computers through WAN 102. Network module 115 may include hardware, such as modems or Wi-Fi signal transceivers or Bluetooth signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network or Bluetooth network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a client of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on. According to at least one other embodiment, in addition to taking any of the forms discussed above with computer 101, EUD 103 may further be a wireless audio device (e.g., a Bluetooth-enabled speaker) or a smart device (e.g., a smart tv) capable of connecting to computer 101 via WAN 102 and network module 115 and capable of receiving operation instructions from NPA program 107. For example, EUD 103 may be a Bluetooth-enabled speaker with an expanded Bluetooth communication protocol configured to receive commands from NPA program 107 located on another device regardless of a paired status (i.e., paired or non-paired) of the Bluetooth-enabled speaker with the other device.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The NPA program 107 may be a program capable of identifying discoverable Bluetooth-enabled audio devices within an environment of a user, maintaining a governing table of time-based allowable decibel levels for an environment, monitoring output sound levels of identified Bluetooth-enabled audio devices within an environment, identifying a Bluetooth-enabled audio device with an output sound level which exceeds an allowed decibel level for an environment, maintaining a list of sound producing Bluetooth-enabled audio devices and their respective output decibel levels, capturing sound clips produced by a Bluetooth-enabled audio device both at the device itself and at a second location, storing a captured sound clip within a memory buffer of a Bluetooth-enabled audio device, comparing a sound clip of a sound producing Bluetooth-enabled audio device captured at the device with a received sound clip of the sound producing Bluetooth-enabled audio device captured at a second location, sending a volume reduction request to a Bluetooth-enabled audio device, receiving a volume reduction request at a Bluetooth-enabled audio device, receiving an acknowledgment (i.e., notification) of a sent volume reduction request, reducing output volume of a Bluetooth-enabled audio device, requesting an incentivized allowance which permits a sound level of a Bluetooth-enabled audio device to exceed a decibel limit of an environment for a period of time, and implementing an accepted incentivized allowance. In at least one embodiment, NPA program 107 may require a user to opt-in to system usage upon opening or installation of NPA program 107 or upon connecting to a wireless audio device managed by NPA program 107. Furthermore, when opting-in to usage of NPA program 107, a user may be required to provide attribute information of their wireless audio device such as a device ID, wireless communication capability and range, and maximum decibel output. Such attribute information may be stored by NPA program 107 within storage 124 or remote database 130. Notwithstanding depiction in computer 101, NPA program 107 may be stored in and/or executed by, individually or in any combination, end user device 103, remote server 104, public cloud 105, and private cloud 106 so that functionality may be separated among the devices. The smart noise pollution amelioration method is explained in further detail below with respect to FIGS. 2, 3, 4, and 5.

Referring now to FIG. 2, an operational flowchart for sending volume reduction requests to one or more wireless audio devices via a smart noise pollution monitoring process 200 is depicted according to at least one embodiment. At 202, NPA program 107 monitors audible sound levels (i.e., decibel levels) within a first location of an environment. According to at least one embodiment, NPA program 107 may utilize a user's smartphone or laptop (e.g., computer 101) to identify and measure audible sound levels at the first location produced by one or more wireless audio devices (e.g., EUD 103) at other locations within a surrounding environment of the user. For example, in an environment of an apartment complex, NPA program 107 may utilize the microphone of a smartphone of a user in a first location (e.g., a first apartment) to identify and measure audible sound levels within the first location being produced by one or more Bluetooth-enabled (BE) speakers in one or more other locations (e.g., other apartments) of the apartment complex.

Next, at 204, NPA program 107 determines whether any identified sound(s) exceed(s) a governing time-of-day based threshold of the environment. In making this determination, NPA program 107 may reference a governing table which specifies permitted decibel (dB) thresholds based on the environment and a time-of-day. According to at least one embodiment, users of BE speakers within the environment may opt-in to limitations of the governing table when opting-in to usage of NPA program 107 as described above. The governing table may be created by an administrative user of NPA program 107 and stored within storage 124 or remote database 130 for access by NPA program 107 during step 204. According to at least one embodiment, NPA program 107 may broadcast (e.g., via a Bluetooth signal) time-based decibel thresholds of an environment to devices of the environment. An example governing table of permitted decibel thresholds based on the environment and a time-of-day is depicted in Table 1 below:

TABLE 1

| Time_Start | Time_End | Environment | Permitted Decibel (dB) Threshold |
|---|---|---|---|
| 10PM | 6:59AM | Apartment complex | 35 dB |
| 7AM | 9:59PM | Apartment complex | 55 dB |
| 8AM | 7PM | Library | 35 dB |
| 5AM | 10PM | Bus | 45 dB |
| 12AM | 11:59PM | Airplane | 40 dB |

As can be seen in Table 1, in the apartment complex environment, a permitted decibel threshold of 35 dB is in effect between 10 PM and 6:59 AM, whereas a permitted decibel threshold of 55 dB is effect between 7 AM and 9:59 PM. Continuing with step 204 and the example of the apartment complex environment, NPA program 107 may reference the governing table above to determine whether a currently identified and measured audible sound level within the first location exceeds a time-of-day based threshold of the apartment complex environment. In response to determining that a currently identified and measured sound level within the first location of the environment exceeds a governing time-of-day based threshold of the environment (step 204, "Y" branch), the smart noise reduction monitoring process 200 may proceed to step 206. In response to determining that a currently identified and measured sound level within the first location of the environment does not exceed a governing time-of-day based threshold of the environment (step 204, "N" branch), the smart noise reduction monitoring process 200 may return to step 202 to continuously monitor audible sound levels within the first location of the environment.

At 206, in response to determining that a currently identified and measured sound level within the first location of the environment exceeds a governing time-of-day based threshold of the environment, NPA program 107 creates a list of active (i.e., sound producing) BE speakers within the environment and in range of the first location. According to at least one embodiment, the created list may include discoverable BE speakers within range of the device (e.g., smartphone or laptop) utilized by NPA program 107 to identify and measure audible sound levels at the first location. For example, the created list may include discoverable BE speakers within a Bluetooth signal reception range of the smartphone of the user located in the first apartment. NPA program 107 may sort the list of discovered BE speakers according to descending wireless (e.g., Bluetooth) signal strength, as such, the topmost listed BE speaker has a highest signal strength. Further, information of listed BE speakers may include, at least, a device ID and an output decibel level of the device. Additional information of listed BE speakers may include a maximum decibel output and wireless communication capability and range. NPA program 107 may store the created list within storage 124 or remote database 130 for subsequent access/modification by NPA program 107 during step 212, discussed below. Furthermore, NPA program 107 may locally store, within the device utilized to identify and measure audible sound levels at the first location, historical information of previously discovered BE speakers of the environment.

According to at least one embodiment, NPA program 107 may also present the created list to the user via a user interface displayed on their smartphone. For example, FIG. 4 illustrates a list of discovered Bluetooth-enabled speakers which may be presented to the user via a user interface 404 displayed on a smartphone 402 of the user. As shown in user interface 404, NPA program 107 may present a list of discovered BE speakers, sorted by descending signal strength, along with their respective device IDs and output decibel levels. Furthermore, NPA program 107 may present, via user interface 404, additional information to the user including the current time, the applicable environment, the current max allowable audio level for the environment, and a status of NPA program 107 operation.

Returning to FIG. 2, at 208, NPA program 107 captures (i.e., records and saves) a clip of the identified and measured sound which was determined to exceed the governing time-of-day based threshold of the environment. According to at least one embodiment, NPA program 107 may capture, via the smartphone of the user located in the first location (e.g., the first apartment) a ten second segment (i.e., sound clip) of the identified threshold exceeding sound. Also, at 208, NPA program 107 sends, via the smartphone of the user, the captured sound clip, its measured decibel level at the first location, and a volume reduction request to the topmost listed BE speaker of the list created at step 206. According to at least one embodiment, the topmost BE speaker of the list may be a BE speaker within the environment (e.g., the apartment complex) having a highest signal strength (relative to the smartphone of the user in the first location) and producing sound at a second location (e.g., a second apartment) of the environment which is audible at the first location.

Next, at 210, NPA program 107 determines whether a notification of match was received from the topmost BE speaker located in the second location. According to at least one embodiment, as a result of sending, via the smartphone of the user, the captured sound clip, its measured decibel level, and the volume reduction request to the topmost listed BE speaker, NPA program 107 may receive either a notification of match or a notification of non-match from the topmost BE speaker. In response to determining that a notification of match was received from the topmost BE speaker (step 210, "Y" branch), the smart noise reduction monitoring process 200 may proceed to step 212. In response to determining that a notification of match was not received (i.e., a notification of non-match was received) from the topmost BE speaker (step 210, "N" branch), the smart noise reduction monitoring process 200 may proceed to step 214.

At 212, in response to determining that a notification of match was not received from the topmost BE speaker, NPA program 107 deletes the topmost BE speaker from the list created at step 206. According to at least one embodiment, a determination that a notification of match was not received from a current topmost BE speaker may indicate that another BE speaker of the environment is the source of the identified and measured sound which was determined to exceed the governing time-of-day based threshold of the environment. As such, NPA program 107 may update the list created at step 206 by deleting the current topmost BE speaker and the smart noise reduction monitoring process 200 may return to step 208 where a later in time sound clip (e.g., a 10 second segment) of the identified threshold exceeding sound may be captured and sent, along with the measured decibel level at the first location and a volume reduction request, to a next topmost listed BE speaker of the updated list.

At 214, in response to determining that a notification of match was received from the topmost BE speaker, NPA program 107 determines whether the identified sound which was previously determined to exceed the governing time-of-day based threshold is now at or below the governing time-of-day based threshold of the environment. According to at least one embodiment, receiving a notification of match may be an indication of confirmation that the topmost BE speaker is the source of the identified audible sound at the first location which was previously determined to exceed the governing time-of-day based threshold. In making this determination, NPA program 107 may, via the smartphone of the user located in the first location, re-measure the decibel level of the identified audible sound at the first location and reference the governing table which specifies permitted decibel (dB) thresholds within the environment. In response to determining that the identified sound which was previously determined to exceed the governing time-of-day based threshold still exceeds the governing time-of-day based threshold (step 210, "N" branch), the smart noise reduction monitoring process 200 may return to step 208 where a later in time sound clip (e.g., a 10 second segment) of the identified threshold exceeding sound may be captured and sent, along with the measured decibel level at the first location and a repeated volume reduction request, to the topmost listed BE speaker of the list. In response to determining that the identified sound which was previously determined to exceed the governing time-of-day based threshold is now at or below the governing time-of-day based threshold (step 214, "Y" branch), the smart noise reduction monitoring process 200 may terminate.

According to at least one embodiment, where it has been determined that the identified sound which was previously determined to exceed the governing time-of-day based threshold is now compliant with the threshold, NPA program 107 may update the created list and present it to the user via the user interface displayed on their smartphone. For example, FIG. 5 illustrates an updated list of discovered Bluetooth-enabled speakers which may be presented to the user via a user interface 504 displayed on a smartphone 502 of the user. As shown in user interface 504, NPA program 107 may present the list of discovered BE speakers, sorted by descending signal strength, along with their respective device IDs and updated output decibel levels. Furthermore, NPA program 107 may present, via user interface 504, additional information to the user including the current time, the applicable environment, the current max allowable audio level for the environment, and an updated status of NPA program 107 operation.

Figure 3:
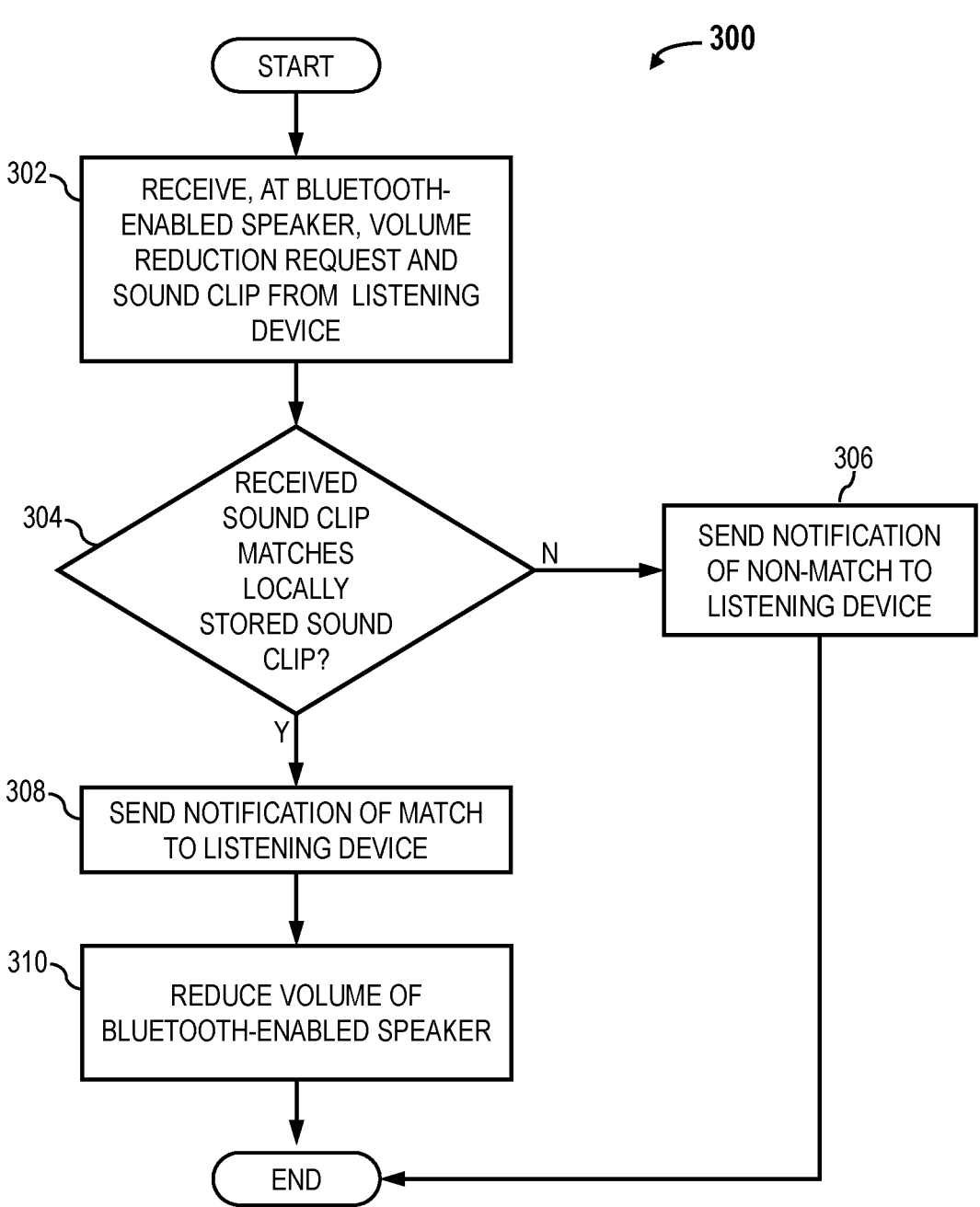
FIG. 3 illustrates an operational flowchart for reducing volume of a wireless audio device via a smart noise pollution reduction process according to at least one embodiment.

Referring now to FIG. 3, an operational flowchart for reducing volume of a wireless audio device via a smart noise pollution reduction process 300 is depicted according to at least one embodiment. At 302, an instance of NPA program 107 executing on a BE speaker receives a sound clip, its measured decibel level, and a volume reduction request from a listening device. According to at least one embodiment, the listening device may be the smartphone or laptop of the user located at the first location of the environment, the sound clip may be the sound clip captured at the first location which exceeded a time-of-day based threshold of the environment, the measured decibel level may be the decibel level of the sound clip at the first location, and the receiving BE speaker may be the topmost BE speaker playing sound at a second location of the environment, as described above in FIG. 2. For example, the sound clip may be the sound captured via the instance of NPA program 107 executing on the smartphone (i.e., listening device) of the user located in the first apartment of the apartment complex and the receiving BE speaker may be the topmost BE speaker, of the list of discovered BE speakers created by the instance of NPA program 107 executing on the user's smartphone, playing sound at a second apartment of the apartment complex. According to at least one embodiment, while BE speakers of an environment are playing sound, respective instances of NPA program 107 executing on the speakers may continuously save a latest segment (e.g., ten seconds) of their respectively played sound. As such, a latest segment of sound played by the receiving BE speaker at the second location may be continuously stored locally within the speaker itself or locally within a device which controls operation of the receiving BE speaker. According to at least one other embodiment, where an instance of NPA program 107 does not execute on the receiving BE speaker, the sound clip, its measured decibel level, and the volume reduction request may be received by an instance of NPA program 107 executing on a device (e.g., a smartphone) of a second user which controls operation of the BE speaker at a second location.

Next, at 304, the instance of NPA program 107 executing on the BE speaker determines whether the received sound clip matches a locally stored latest segment (i.e., sound clip) of played sound. In making this determination, the instance of NPA program 107 executing on the BE speaker may perform a frequency analysis of both the received sound clip and the locally stored latest sound clip to identify a level of similarity between the sound clips. According to at least one embodiment, NPA program 107 may utilize known spectral analysis techniques to deconstruct the audio signals of each sound clip into their respective frequency components using techniques such as Fourier transforms, and then compare respective spectrograms or spectral features of the sound clips to identify a level of similarity between their respective frequency distributions. According to at least one other embodiment, NPA program 107 may utilize known machine learning techniques to train a learning model such as a convolutional neural network (CNN) or a recurrent neural network (RNN) to learn representations of audio data of the sound clips and perform similarity comparisons. According to at least one further embodiment, NPA program 107 may utilize known cross-correlation techniques to measure the similarity between respective audio signals of the sound clips by sliding one over the other and computing a correlation score at different positions. Higher correlation scores between audio signals of the sound clips may indicate greater similarity. According to yet another embodiment, NPA program 107 may utilize known methods of feature extraction and comparison to extract respective relevant features from the sound clips, such as Mel-frequency cepstral coefficients (MFCCs), chroma features, or rhythm patterns, and then use distance metrics, such as Euclidean distance or cosine similarity, to compare feature vectors. Regardless of the utilized technique for comparison, the instance of NPA program 107 executing on the BE speaker may determine a level of match between the received sound clip and the locally stored latest sound clip to a threshold degree or to a threshold confidence level to allow for a delta of deviation between the sound clips. A delta of deviation between the sound clips may exist because of attenuation of various frequencies of the sound produced by the BE speaker at the second location as it travels to another location (e.g., the first location) within the environment where it may be captured by a listening device. In response to determining that the received sound clip does not match the locally stored latest segment of played sound (step 304, "N" branch), the smart noise pollution reduction process 300 may proceed to step 306. In response to determining that the received sound clip matches the locally stored latest segment of played sound (step 304, "Y" branch), the smart noise pollution reduction process 300 may proceed to step 308.

At 306, in response to determining that the received sound clip does not match the locally stored latest segment of played sound, the instance of NPA program 107 executing on the BE speaker sends a notification of non-match to the listening device. According to at least one embodiment, the notification of non-match sent to the instance of NPA program 107 running on the smartphone or laptop of the user located at the first location of the environment may indicate that the received sound clip does not match the locally stored sound clip and thus the receiving BE speaker is not the source of the received sound clip. For example, the instance of NPA program 107 executing on the BE speaker may send a notification of non-match to the instance of NPA program 107 executing on the smartphone of the user located in the first apartment of the apartment complex which indicates that the sound producing BE speaker at the second apartment (i.e., the topmost BE speaker of the list of discovered BE speakers created by the instance of NPA program 107 executing on the user's smartphone in process 200) is not the source of the sound clip captured at the first apartment.

At 308, in response to determining that the received sound clip matches, to a threshold degree or confidence level, the locally stored latest segment of played sound, the instance of NPA program 107 executing on the BE speaker sends a notification of match to the listening device. According to at least one embodiment, the notification of match sent to the instance of NPA program 107 running on the smartphone or laptop of the user located at the first location of the environment may indicate that the received sound clip matches the locally stored sound clip and thus the receiving BE speaker is the source of the received sound clip. For example, the instance of NPA program 107 executing on the BE speaker may send a notification of match to the instance of NPA program 107 executing on the smartphone of the user located in the first apartment of the apartment complex which indicates that the sound producing BE speaker at the second apartment (i.e., the topmost BE speaker of the list of discovered BE speakers created by the instance of NPA program 107 executing on the user's smartphone in process 200) is the source of the sound clip captured at the first apartment.

Next, at 310, the instance of NPA program 107 executing on the BE speaker reduces the level of output volume of the BE speaker. According to at least one embodiment, the instance of NPA program 107 executing on the BE speaker may reduce the volume of the BE speaker by a certain percentage based on the measured decibel level received from the listening device. For example, if the received measured decibel level of the sound clip at the first location exceeds a time-of-day based threshold of the environment by ten percent, the instance of NPA program 107 executing on the BE speaker may reduce volume by ten percent. NPA program 107 may reference the governing table which specifies permitted decibel (dB) thresholds within the environment when reducing volume of a BE speaker of the environment.

According to at least one other embodiment, NPA program 107 may provide for an incentivized allowance feature whereby a user in a first location of an environment (e.g., a user within a first apartment of an apartment building) may request, from one or more other users in one or more other locations of the environment (e.g., users within other apartments of the apartment building), a temporarily allowed deviation from a governing time-of-day based decibel threshold of the environment in exchange for an incentive offered by the user. For example, if a first user has an event coming up for which they want to exceed a governing decibel threshold during the event, the user may, via an instance of NPA program 107 executing on a listening device (e.g., a smartphone) of the user, request a deviation allowance from one or more neighboring users to allow music play back by a BE speaker at the user's location which exceeds the governing threshold. The deviation allowance request may include information specifying the day of the event, a BE speaker ID, a desired decibel threshold for sound play back at the user's location, a timeframe for sound play back on the day of the event, and an offered incentive (e.g., an offered remuneration) for the requested deviation allowance. NPA program 107 may send the deviation allowance request to respective instances of NPA program 107 executing on listening devices of other users within discoverable Bluetooth range of the listening device of the user. Furthermore, the respective instances of NPA program 107 may present information of the requested deviation allowance, with options to accept or deny the request, to the other users via user interfaces displayed on their respective listening devices. In such an embodiment, once another user of the environment accepts the deviation allowance request from the first user, the instance of NPA program 107 executing on the listening device of the other user may locally store information of the accepted request and not send a volume reduction request to the instance of NPA program 107 executing on the listening device of the first user during the specified timeframe for sound play back by the specified BE speaker ID. However, it should be noted that a volume reduction request may be sent to the instance of NPA program 107 executing on the listening device of the first user during the specified timeframe if a decibel output of the specified BE speaker ID exceeds the desired decibel threshold specified in the deviation allowance request. The offered incentive may be automatically processed via cryptocurrency exchange between digital wallets of the users.

It may be appreciated that FIGS. 2, 3, 4, and 5 provide only an illustration of one implementation and does not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

monitoring, via a listening device, audible sounds and corresponding sound levels at a first location of an environment;

identifying an audible sound at the first location with a corresponding sound level which exceeds a decibel threshold of the environment, wherein the audible sound is produced by a device at another location;

responsive to the identifying, creating a list of Bluetooth-enabled (BE) speakers discoverable via the listening device, wherein the list is sorted by decreasing signal strength;

capturing a segment of the audible sound;

sending, from the listening device, a volume reduction request (VRR) to a topmost BE speaker of the list, wherein the topmost BE speaker is located at a second location of the environment;

in response to receiving, at the listening device, a notification of match from the topmost BE speaker, remeasuring the corresponding sound level of the audible sound; and confirming the corresponding sound level is compliant with the decibel threshold.

2. The method of claim 1, further comprising:

capturing, at the topmost BE speaker, a latest segment of sound produced at the second location;

receiving, at the topmost BE speaker, the VRR, wherein the VRR comprises the segment of the audible sound and the corresponding sound level;

comparing the segment of the audible sound and the latest segment of sound produced at the second location; and in response to the segment of the audible sound and the latest segment of sound produced at the second location matching to a threshold degree of similarity:

sending the notification of match to the listening device; and reducing an output volume level of the topmost BE speaker.

3. The method of claim 2, further comprising:

in response to the segment of the audible sound and the latest segment of sound produced at the second location not matching to a threshold degree of similarity, sending a notification of non-match to the listening device.

4. The method of claim 3, further comprising:

in response to receiving, at the listening device, the notification of non-match from the topmost BE speaker:

deleting the topmost BE speaker from the list; and sending, from the listening device, a next volume reduction request (VRR) to a next topmost BE speaker of the list, wherein the next topmost BE speaker is located at a location of the environment different from the first location.

5. The method of claim 2, wherein comparing the segment of the audible sound and the latest segment of sound produced at the second location further comprises:

deconstructing audio signals of both the segment of the audible sound and the latest segment of sound into their respective frequency components; and comparing respective spectrograms or spectral features of the segment of the audible sound and the latest segment of sound to identify a level of similarity between their respective frequency distributions.

6. The method of claim 2, wherein the output volume level of the topmost BE speaker is reduced by a certain percentage based on the corresponding sound level received from the listening device.

7. The method of claim 1, further comprising:

receiving, at the listening device at the first location, a request from a BE speaker at another location of the environment to exceed the decibel threshold on a specified date and for a specified timeframe in exchange for an incentive; and responsive to an acceptance of the incentive by a user of the listening device, permitting the BE speaker at the other location to exceed the decibel threshold on the specified date and for the specified timeframe.

8. A computer system, the computer system comprising: one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

monitoring, via a listening device, audible sounds and corresponding sound levels at a first location of an environment;

identifying an audible sound at the first location with a corresponding sound level which exceeds a decibel threshold of the environment, wherein the audible sound is produced by a device at another location;

responsive to the identifying, creating a list of Bluetooth-enabled (BE) speakers discoverable via the listening device, wherein the list is sorted by decreasing signal strength;

capturing a segment of the audible sound;

sending, from the listening device, a volume reduction request (VRR) to a topmost BE speaker of the list, wherein the topmost BE speaker is located at a second location of the environment;

in response to receiving, at the listening device, a notification of match from the topmost BE speaker, re-measuring the corresponding sound level of the audible sound; and confirming the corresponding sound level is compliant with the decibel threshold.

9. The computer system of claim 8, further comprising:

capturing, at the topmost BE speaker, a latest segment of sound produced at the second location;

receiving, at the topmost BE speaker, the VRR, wherein the VRR comprises the segment of the audible sound and the corresponding sound level;

comparing the segment of the audible sound and the latest segment of sound produced at the second location; and in response to the segment of the audible sound and the latest segment of sound produced at the second location matching to a threshold degree of similarity:

sending the notification of match to the listening device; and reducing an output volume level of the topmost BE speaker.

10. The computer system of claim 9, further comprising:

in response to the segment of the audible sound and the latest segment of sound produced at the second location not matching to a threshold degree of similarity, sending a notification of non-match to the listening device.

11. The computer system of claim 10, further comprising:

in response to receiving, at the listening device, the notification of non-match from the topmost BE speaker;

deleting the topmost BE speaker from the list; and sending, from the listening device, a next volume reduction request (VRR) to a next topmost BE speaker of the list, wherein the next topmost BE speaker is located at a location of the environment different from the first location.

12. The computer system of claim 9, wherein comparing the segment of the audible sound and the latest segment of sound produced at the second location further comprises:

deconstructing audio signals of both the segment of the audible sound and the latest segment of sound into their respective frequency components; and comparing respective spectrograms or spectral features of the segment of the audible sound and the latest segment of sound to identify a level of similarity between their respective frequency distributions.

13. The computer system of claim 9, wherein the output volume level of the topmost BE speaker is reduced by a certain percentage based on the corresponding sound level received from the listening device.

14. The computer system of claim 8, further comprising:

receiving, at the listening device at the first location, a request from a BE speaker at another location of the environment to exceed the decibel threshold on a specified date and for a specified timeframe in exchange for an incentive; and responsive to an acceptance of the incentive by a user of the listening device, permitting the BE speaker at the other location to exceed the decibel threshold on the specified date and for the specified timeframe.

15. A computer program product, the computer program product comprising:

one or more computer-readable tangible storage medium and program instructions stored on at least one of the one or more tangible storage medium, the program instructions executable by a processor capable of performing a method, the method comprising:

monitoring, via a listening device, audible sounds and corresponding sound levels at a first location of an environment;

identifying an audible sound at the first location with a corresponding sound level which exceeds a decibel threshold of the environment, wherein the audible sound is produced by a device at another location;

responsive to the identifying, creating a list of Bluetooth-enabled (BE) speakers discoverable via the listening device, wherein the list is sorted by decreasing signal strength;

capturing a segment of the audible sound;

sending, from the listening device, a volume reduction request (VRR) to a topmost BE speaker of the list, wherein the topmost BE speaker is located at a second location of the environment;

in response to receiving, at the listening device, a notification of match from the topmost BE speaker, re-measuring the corresponding sound level of the audible sound; and confirming the corresponding sound level is compliant with the decibel threshold.

16. The computer program product of claim 15, further comprising:

capturing, at the topmost BE speaker, a latest segment of sound produced at the second location;

receiving, at the topmost BE speaker, the VRR, wherein the VRR comprises the segment of the audible sound and the corresponding sound level;

comparing the segment of the audible sound and the latest segment of sound produced at the second location; and in response to the segment of the audible sound and the latest segment of sound produced at the second location matching to a threshold degree of similarity:

sending the notification of match to the listening device; and reducing an output volume level of the topmost BE speaker.

17. The computer program product of claim 16, further comprising:

in response to the segment of the audible sound and the latest segment of sound produced at the second location not matching to a threshold degree of similarity, sending a notification of non-match to the listening device.

18. The computer program product of claim 17, further comprising:

in response to receiving, at the listening device, the notification of non-match from the topmost BE speaker:

deleting the topmost BE speaker from the list; and sending, from the listening device, a next volume reduction request (VRR) to a next topmost BE speaker of the list, wherein the next topmost BE speaker is located at a location of the environment different from the first location.

19. The computer program product of claim 16, wherein comparing the segment of the audible sound and the latest segment of sound produced at the second location further comprises:

deconstructing audio signals of both the segment of the audible sound and the latest segment of sound into their respective frequency components; and comparing respective spectrograms or spectral features of the segment of the audible sound and the latest segment of sound to identify a level of similarity between their respective frequency distributions.

20. The computer program product of claim 16, wherein the output volume level of the topmost BE speaker is reduced by a certain percentage based on the corresponding sound level received from the listening device.

\* \* \* \* \*